United States Patent [19]

Tinker et al.

[11] Patent Number: 4,479,815

[45] Date of Patent: Oct. 30, 1984

[54] PNEUMATIC CONTROLLER AND ALARM FOR ADSORBENT FRACTIONATERS, PARTICULARLY DESSICANT DRYERS

[75] Inventors: Craig S. Tinker; Thomas G. Haberer, both of Ocala, Fla.

[73] Assignee: Pall Corporation, Glen Cove, N.Y.

[21] Appl. No.: 473,855

[22] Filed: Mar. 9, 1983

[51] Int. Cl.³ .............................................. B01D 53/04
[52] U.S. Cl. ...................................... 55/163; 55/179; 55/274; 55/387
[58] Field of Search .................... 55/18, 20, 21, 33, 74, 55/160, 161, 163, 179, 387, 389, 274, 275

[56] References Cited

U.S. PATENT DOCUMENTS

| | | | |
|---|---|---|---|
| 2,944,627 | 7/1960 | Skarstrom | 55/179 X |
| 3,323,292 | 6/1967 | Brown | 55/179 X |
| 3,775,946 | 12/1973 | Brazzel | 55/179 X |
| 4,101,298 | 7/1978 | Myers et al. | 55/179 X |
| 4,205,967 | 6/1980 | Sandman et al. | 55/179 X |
| 4,231,768 | 11/1980 | Seibert et al. | 55/179 |
| 4,247,311 | 1/1981 | Seibert et al. | 55/179 X |
| 4,306,889 | 12/1981 | Kruger et al. | 55/179 X |
| 4,322,228 | 3/1982 | Myers et al. | 55/179 X |
| 4,331,457 | 5/1982 | Morner | 55/179 X |
| 4,349,357 | 9/1982 | Russell | 55/179 X |

Primary Examiner—Robert Spitzer
Attorney, Agent, or Firm—Leydig, Voit, Osann, Mayer & Holt, Ltd.

[57] ABSTRACT

A pneumatic controller is provided for a two-bed adsorbent fractionator, particularly a heaterless dessicant dryer, having pneumatically controlled inlet and exhaust flow valves and, optionally, a repressurization valve. The flow valves are controlled by a schedule of pneumatic pilot signals generated by the controller from a source of pressurized gas, e.g., gas tapped from and at the line pressure of the outlet of the fractionater. Control valves within the controller selectively apply the full pressure from the source as pilot signals to the flow valves of the fractionater. A variable regulated pressure is utilized to control these control valves according to a schedule established by the time periods to fill two timing volumes through variable orifices. The time period to fill one timing volume establishes the length of the regeneration-prior-to-repressurization period, with that for the other timing volume establishing the repressurization period, the two time periods together establishing the length of the on stream time for the on stream bed. In a preferred embodiment the controller may be programmed for either normally-open or normally-closed exhaust valves. An optional switching failure alarm circuit provides an indication of a switching failure as determined by the relative pressures of the two beds during the various phases of a cycle.

8 Claims, 5 Drawing Figures

PNEUMATIC CONTROLLER AND ALARM FOR ADSORBENT FRACTIONATERS, PARTICULARLY DESSICANT DRYERS

BACKGROUND OF THE INVENTION

1. Field of the Invention

This invention relates to a pneumatic control system and alarm for adsorbent fractionaters. The control system and alarm is particularly suited for use with desiccant dryers and, more particularly, desiccant dryers of the relatively short cycle, heaterless type, such as disclosed, for example, in U.S. Pat. No. 2,944,627 to Skarstrom. Dryers of this type are currently marketed by several manufacturers around the world, including the present assignee. While controllers for heaterless dryers manufactured by the present assignee and others typically include electrical components, in some applications electricity may not be available or suitable as an energy source for the controller.

2. Description of the Prior Art

U.S. Pat. No. 4,205,967 to Sandman et al. and assigned to the present assignee discloses a pneumatic controller for use with desiccant dryers. A portion of the pressurized, product quality gas is employed as the energy source for the controller, with a time schedule for a series of reduced pressure, pneumatic valve control signals being generated based on time intervals determined by the length of time required to fill timing volumes to predetermined pressures. The time intervals may be varied by adjusting the sizes of orifices in the lines leading to the timing volumes. Pneumatic controllers of the type disclosed in the referenced patent have enjoyed success in applications where electric controllers are not suitable.

SUMMARY OF THE INVENTION

The pneumatic controller of the present application is an improvement upon and offers several significant technical advantages over the controllers disclosed in the referenced patent while at the same time permitting a significant cost reduction. Among the technical advantages of the controller of the present invention over the patented controller are: (1) the application of full line pressure to the flow control valves of the desiccant dryer; (2) the ability to conveniently adjust either or both of two independent variables, namely the orifice size and the pressure upstream of the orifice, to adjust the time required to fill the respective timing volumes; (3) a programming option to directly accommodate either normally open or normally closed exhaust valves and (4) an optional alarm to signal a malfunction in either the pressurization or depressurization of the adsorbent beds. These and other objects and advantages of the present invention will become apparent upon reading the following detailed description and upon reference to the drawings, in which:

DESCRIPTION OF THE PREFERRED EMBODIMENT

While the invention will be described in connection with a preferred embodiment, it will be understood that we do not intend to limit the invention to this embodiment. On the contrary, we intend to cover all embodiments, modifications and equivalents as may be included within the spirit and scope of the invention as defined in the appended claims.

Figure 1:
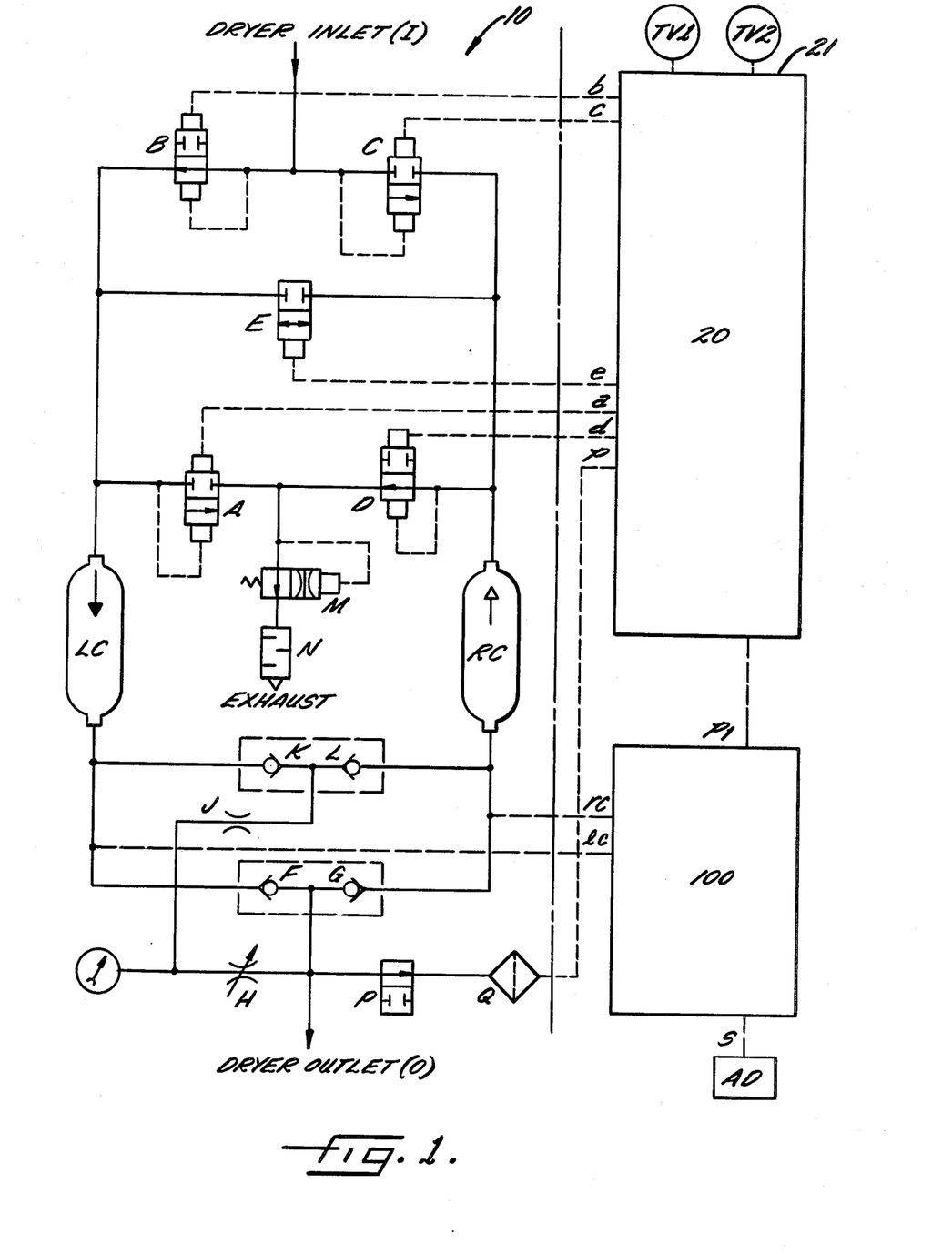
FIG. 1 is a general schematic of a heaterless dryer of the type which may be operated by the control system of the present invention.

Turning to FIG. 1, there is schematically illustrated a two-bed heaterless dryer 10 of the type which may be controlled by a pneumatic controller 20 of the present invention. The dryer shown is of conventional design, with pilot-actuated control valves A-E alternately directing the inlet air through either the left chamber LC or the right chamber RC while the other chamber is being regenerated and prepared for its next adsorption step. The controller 20 is powered by pressurized outlet air via an input p to the controller and provides the appropriate sequence of pilot signals a-e to control the valves A-E, respectively. While it is contemplated that most dryers will include the inlet valves B and C and the outlet valves A and DC (or their equivalents; see, e.g., the FIG. 2 embodiment discussed below), the repressurization valve E may be omitted if not required. Accordingly, while the discussion which follows assumes that a repressurization valve E is employed, the controller according to the invention is equally useful on dryers which omit the repressurization valve by simply plugging the port for the pilot signal e.

In the embodiment shown, valves A-D are two-way normally open valves, such that, in the absence of a pneumatic pilot signal, the valves are open to the flow of gas through them. Conversely, if a pneumatic pilot signal is present at one or more of the valves A-D, that valve closes and blocks the flow of gas therethrough. Valve E, on the other hand, is a two-way normally closed valve, such that, in the absence of a pneumatic pilot signal, the valve is closed, blocking the flow of gas therethrough. A pilot signal causes the valve to open, allowing the passage of gas. The following table indicates the sequence of pilot signals to valves A through E for a complete operating cycle. In Table I below an "X" indicates the presence of pneumatic pilot signals a-e during the indicated phase of a complete cycle. As explained above, for valves A-D, the pilot signals close the valves, for valve E the pilot signal opens the valve. Conversely, an "0" indicates the absence of a pneumatic pilot signal and an open valve condition for valves A-D and a closed valve condition for valve E.

TABLE I

| Pilot Signal | L.C. Drying | | R.C. Drying | |
|---|---|---|---|---|
| | R.C. Regen. | R.C. Repress. | L.C. Regen. | L.C. Repress. |
| a | X | X | O | X |
| b | O | O | X | X |
| c | X | X | O | O |
| d | O | X | X | X |
| e | O | X | O | X |

Briefly explaining the valve operation during a cycle, throughout the "left chamber drying" phase (during which the right chamber first regenerates and then repressurizes), as indicated in Table I, the valve B has no pneumatic control signal present, such that it allows gas at line pressure (typically between 100 and 300 psi) from the inlet I to pass through the left chamber LC, through the check valve F and out the outlet O. A fraction of the outlet gas is bled off through the variable and fixed orifices H and J, respectively, whereupon it passes at substantially ambient pressure through the check valve L, the right chamber RC, the open exhaust valve D, and out through flow restrictor valve M and the muffler N. The right chamber inlet valve C and the left chamber exhaust valve A are both closed throughout the "left chamber drying" phase, preventing flow therethrough. Near the end of the "left chamber drying" period, pneumatic pilot signals are simultaneously applied to the right chamber exhaust valve D and, the repressurization valve E. These respective signals cause the closing of exhaust valve D and the opening of repressurization valve E, thereby causing the right chamber RC to be pressurized to line pressure. Following that repressurization of the right chamber RC, appropriate pneumatic control signals close the repressurization valve E, open the right chamber inlet valve C, open the left chamber exhaust valve A and close the left chamber inlet valve B, establishing a "right chamber drying" flow configuration. In this configuration, the pressurized inlet air passes through the right chamber RC and the check valve G to the outlet O. The portion of the pressurized, product quality outlet gas bled off through variable and fixed orifices H and J passes at substantially ambient pressure through check valve K, into the left chamber LC, through the left chamber exhaust valve A, and out through the flow restrictor valve M and the muffler N.

Near the end of the "right chamber drying" cycle, the left chamber exhaust valve A is closed and the repressurization valve E is opened to permit the left chamber to be repressurized in preparation for being switched back "on stream" at the end of the "right chamber drying" phase. The cycle then repeats itself. Cycles are typically either 10 minutes total (5 minutes for each of the "left chamber drying" and "right chamber drying" phases—a 10 minute NEMA cycle) or 4 minutes total (a 4 minute NEMA cycle). For either of these cycles the repressurization periods for both beds are typically about 30 seconds each, leaving about 270 seconds for regeneration of each bed in the case of a 10 minute NEMA cycle and 90 seconds in the case of a 4 minute NEMA cycle.

Throughout the cycle a portion of the pressurized outlet gas is tapped off near the outlet, after which it is shown passing through a valve P and a filter Q prior to being directed to the control system 20 as inlet p thereto.

Figure 2:
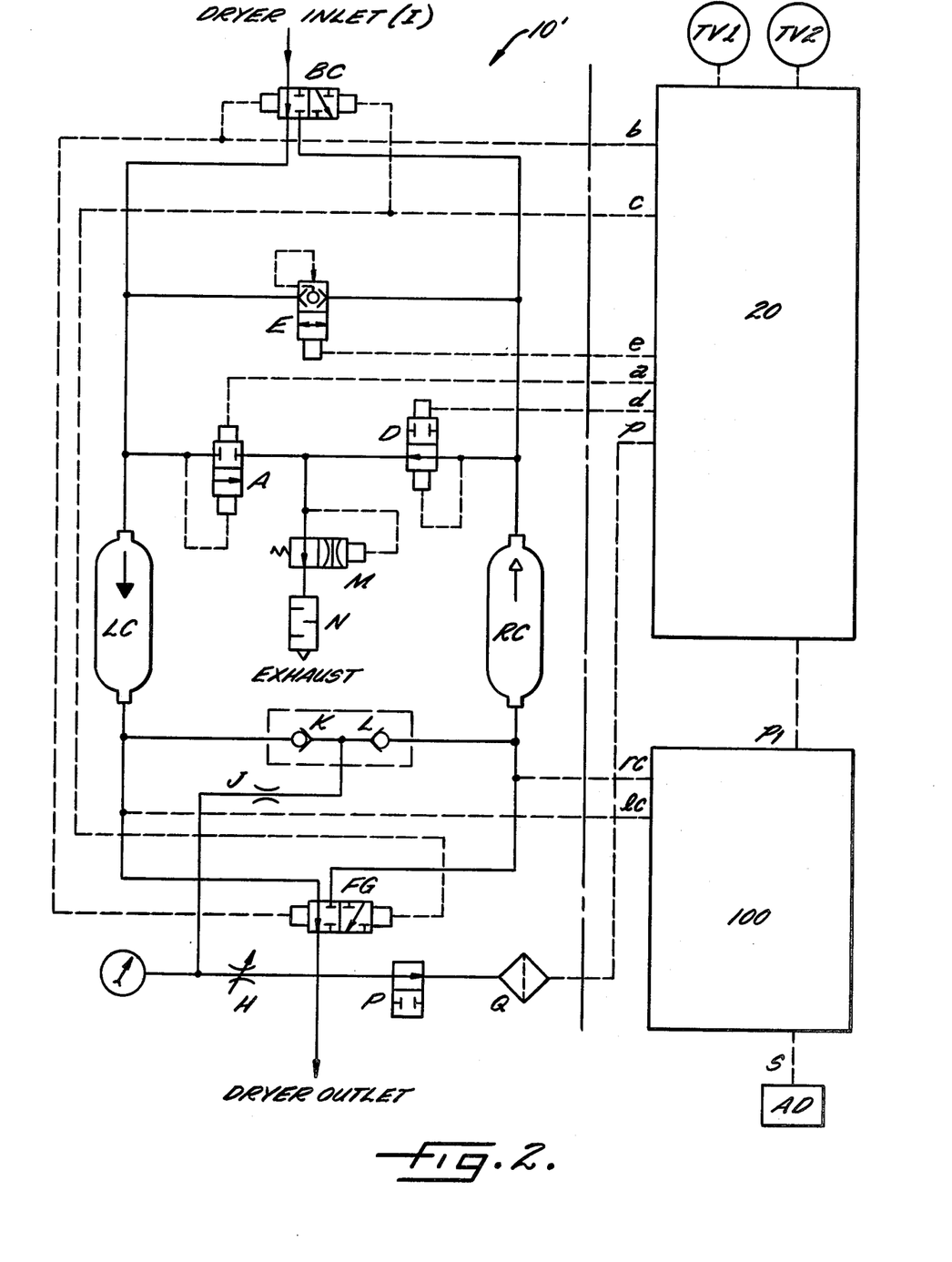
FIG. 2 is a general schematic of a heaterless dryer having a valving arrangement somewhat different from that shown in FIG. 1 but which also may be operated by the control system of the present invention.

FIG. 2 illustrates an alternative valving arrangement for a heaterless dryer. In the FIG. 2 system a dual-piloted three-way inlet valve BC and a dual-piloted three-way outlet valve FG are substituted for single-piloted two-way inlet valves B and C and outlet check valves F and G, respectively. The same pilots b and c operate both valves BC and FG, resulting in synchronized operation. Except for the differences in the inlet and outlet valving, the remainder of the FIG. 2 embodiment is the same as in the FIG. 1 embodiment. It will be appreciated that, despite the differences between the FIG. 1 and FIG. 2 embodiments, the pilot sequence in Table 1 above is applicable to both configurations.

From the above explanation, it will be apparent that a control system is necessary to generate the appropriate sequence of pilot signals a-e to control the valves A-E of FIG. 1 or the valves A, BC, D, E and FG of FIG. 2 during the four phases of a complete drying cycle. The control system of the present invention provides such sequencing.

1. Control System

Figures 3, 4:
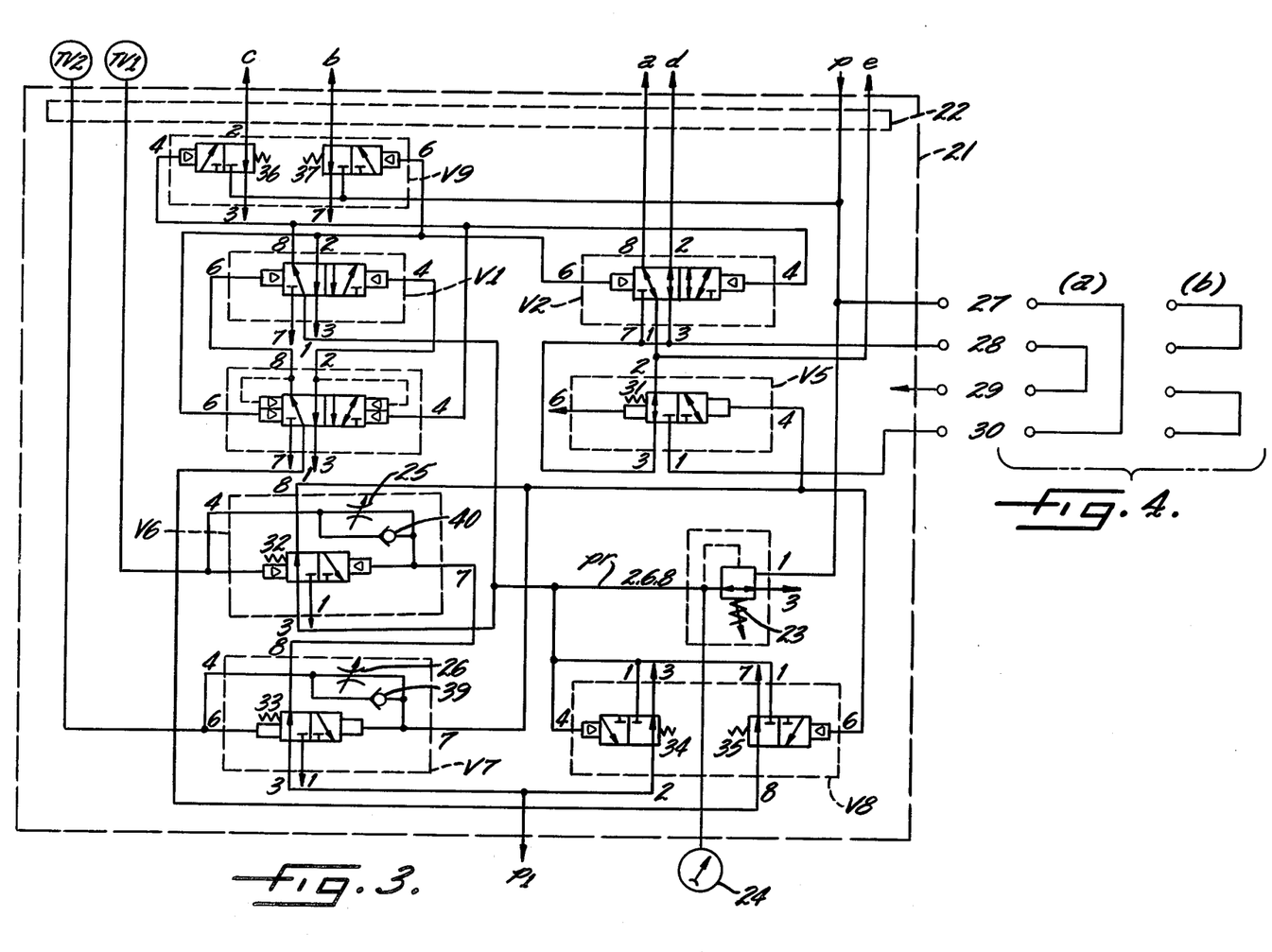
FIG. 3 is a schematic of the control system of the present invention.
FIG. 4 is an inset showing the alternative programming modes for the control system of FIG. 3.

Turning to FIG. 3, a control system 20 according to the present invention is schematically shown. The control system comprises nine separate control valves V1-V9, which may be mounted to a manifold block 21 (shown in outline only) to provide the interconnections schematically illustrated. One type of particularly advantageous arrangement utilized is a technique known to those skilled in the art whereby a manifold block laminated from several layers each having a separate network of milled channels and through holes to accommodate the "cross-overs" shown the FIG. 3. The several different types of valves shown, discussed in more detail below are each available in the Minimatic TM valve series of Clippard Measurement Laboratory, Inc. in Cincinnati, Ohio. The generally similar configuration and mounting system for the various valves renders the arrangement susceptible to a very compact packaging. In addition to the nine valves mounted directly to the manifold block 11, two timing volumes, shown schematically as TV1 and TV2 in FIGS. 1-3 are required and, depending on their size, may be mounted remote from the manifold block 21. For the embodiment shown the pneumatic accumulator TV1 is a cylindrical one having a volume of 42.32 cubic inches; pneumatic accumulator TV2 is also cylindrical, axially surrounding TV1 and having a volume of 145.21 cubic inches. The several pneumatic connections to the manifold block, including the input p, the outputs a-e, and the connections to the pneumatic accumulators TV1 and TV2 may, for convenience, be made at a single modular connector, depicted schematically in FIG. 3 at 22.

The Clippard model numbers and brief descriptions for the valves V1-V9 used in the embodiment shown in FIG. 3 are as follows:
V1 and V2—R-402, four-way valves
V3—R-451, binary trigger valve
V4—R-701, pressure regulator
V5—R-301, three-way valve
V6 and V7—R-343, three-way delay valve
V8 and V9—R-352, dual three-way valves The ports of the valves V1-V9 are numbered in FIG. 3 to correspond to the port numbering system adopted by the manufacturer. Unlabeled arrows on the FIG. 3 schematic, e.g., at programming port 29 (discussed below) and at ports 3 and 7 of valve V1, to name only a few, depict vents to atmosphere. In the event it is either necessary or desirable to collect the vent gas from some or all of the several vents, a network of collecting ducts (not shown) may be provided. The control system 20 is shown in FIG. 3 with the valves in the states they assume with no pressure in at the inlet p, outputs a-e, in the internal lines, or in pneumatic accumulators TV1 or TV2.

The control system 20 as illustrated contains three independently adjustable parameters. The first of these is the regulated pressure level leaving valve V4, adjustable at 23 and shown monitored at gauge 24. The other two independently controllable parameters are the variable orifices 25 and 26 of valves V6 and V7, respectively. As explained in more detail below, these orifices control the overall cycle times by controlling the repressurization periods and the regeneration-prior-to-repressurization periods, respectively.

The control system illustrated is able to accommodate either normally open exhaust valves A and D, as illustrated in FIGS. 1 and 2, or normally closed valves. Accommodation of either of the two types of exhaust valves is effected by programming the controller with alternative configurations of jumpers at the programming ports 27-30 as shown in FIG. 4. The FIG. 4a jumper configuration is for normally closed exhaust valves; the FIG. 4b jumper configuration is for normally open exhaust valves, as employed in FIGS. 1 and 3. It will be seen from a comparison between the jumper configurations that the alternatives effectively reverse the application of the pressure from input port p which appears at the programming port 27, and the vent to atmosphere which appears at the programming port 29. As will be appreciated from the description which follows, reversing the jumper configuration from that shown in FIG. 4a to that shown in FIG. 4b while simultaneously substituting normally open exhaust valves for normally closed exhaust valves results in a sequence of signals at outputs a and d which results in the same flow configuration as discussed above in connection with FIG. 1. It should be noted that the control system 20 is designed such that switching between the programming mode shown in FIG. 4a and that shown in FIG. 4b also effects a reversal of the logic of output e. Accordingly, the normally closed repressurization valves E in FIGS. 1 and 2 must be replaced with normally open repressurization valves when the system is programmed as illustrated in FIG. 4a.

Having explained the various inputs, outputs, adjustments and programming options, the operation of the control system 20 during one complete cycle will now be described. It is assumed that normally open exhaust valves are employed as illustrated in FIGS. 1 and 2, and, accordingly, that the programming ports are connected as in FIG. 4b. As a supplement to the description which follows, reference may be made to the following Table II which shows the state of valves V1-V3 and V5-V9 at each of the four phases of a complete cycle (the pressure regulator valve V4 undergoes no change of state during the cycle). As used in the following table, an "O" indicates that the valve is in the state shown in FIG. 3. An "X" indicates that the spool of the valve has been shifted to its alternative state (not specifically illustrated).

| Valve | L.C. Drying R.C. Regen. | L.C. Drying R.C. Repress. | R.C. Drying L.C. Regen. | R.C. Drying L.C. Repress. |
|---|---|---|---|---|
| V1 | O | O | X | X |
| V2 | X | X | O | O |
| V3 | O | X | X | O |
| V5 | X | O | X | O |
| V6 | O | X | O | X |
| V7 | X | O | X | O |
| V8 Left | X | X | X | X |
| V8 Right | X | O | X | O |
| V9 Left | X | X | O | O |
| V9 Right | O | O | X | X |

Considering first the overall functional relationships of the valves V1-V9 in FIG. 3, valve V9 selectively controls the application of full input pressure as the pilot signals b and c for the inlet (and any outlet) valves (B and C in FIG. 1; BC and FG in FIG. 2). Similarly, valves V2 and V5, in combination, selectively control the application of the same full input pressure as the pilot signal a, d and e for exhaust valves A and D, and repressurization valve E, respectively (both FIG. 1 and FIG. 2). Valve V1 simultaneously controls both valve V9 and V2, with valve V1 itself being controlled by the interaction of the remainder of the valves V3, V4 and V6-V8 and the timing volumes TV1 and TV2. Finally, valve V5 is controlled by the interaction of valve V6 and timing volume TV1. As will become clear from the following explanation, the setting of the variable orifice 25 of valve V6, in conjunction with the setting of the pressure regulator V4, as monitored at gauge 24, determines the length of the repressurization phase for the off-stream bed being regenerated. Similarly, the settings of the variable orifice 26 of valve V7, also in conjunction with the setting of the pressure regulator V4, determines the length of the regeneration-prior-to-repressurization phase of the off stream bed. The sum of those two periods of time determines the length of time that the on stream bed is actually on stream processing inlet air.

a. Start-up—Left Chamber Drying, Right Chamber Regenerating

Upon application of pressure at the inlet p, as upon startup of the dryer 10 when pressure appears at the dryer outlet O and valve P is open as shown in FIGS. 1 and 2, the full line pressure of the dryer outlet O is applied to at several locations, including port 1 of valve V9, port 1 of valve V4, and, through programming ports 1 and 2, ports 3 and 7 of valve V2 and port 3 of valve V5. The presence of full line pressure at valves V9, V2 and V5 serves as the source for the outputs a-e, depending on the states of those valves. The presence of the line pressure at valve V4 provides a source of regulatable pressure for control of the remainder of the valves V1, V3 and V6-V8, which cooperate with the timing volumes TV1 and TV2 to control the valves V2, V5 and V9. As will be appreciated from the following discussion, the regulated pressure pr at the outlet of regulator V4 may be varied between the full line pressure p and a minimum capable of overcoming springs 31-37 in valves V5-V9, respectively. It has been found that a minimum regulated pressure pr of about 50 psi is adequate for this purpose.

Considering first the start-up of the controller, immediately upon the initial pressurization of the system regulated pressure pr is applied at several locations. By virtue of its application at port 3 of valve V6, then in the state shown in FIG. 3, the regulated pressure pr is applied at (i) port 6 of the right element of V8, shifting that element against its spring 35 and, as a result, applying the pressure pr to port 1 of valve V3, and in turn holding valve V1 in the position shown; (ii) port 4 of V5, shifting its element and (iii) at port 7 of valve V7, discussed further below. Also, the application of the regulated pressure pr at port 1 of valve V1 results in its application, through valve V1, to (i) port 4 of valve V9, shifting the left element thereof against the spring 35 and resulting in a pilot signal at C, (ii) at port 4 of V2, shifting its element, resulting in a pilot signal at a and (iii) at port 4 of binary trigger valve V3. This latter action has no immediate effect but sets the stage for the switchover from right chamber regenerating to right chamber repressurizing at a later point.

As shown schematically in FIG. 3, the valve V3 has dual pilots at each side of its element. The top pilots, each internally connected to one of the output ports 2 and 8, are larger in area than the lower pilots, ported at 6 and 4. Hence, inasmuch as it is the same regulated pressure pr that is available at each of the pilots, a single pilot regardless of which it is will actuate the valve in the direction the pilot is acting, a top pilot on one side will prevail over a lower pilot on the other side; two pilots on one side will prevail over a single pilot on the other side. Moreover, no actuation will occur when a corresponding pilot is applied after its counterpart. Similarly, no actuation will occur when a single pilot which has already resulted in actuation is removed (valves V1 and V2 also obey these latter two rules).

Recalling that, at startup, the regulated pressure pr is present at port 8, and consequently at the upper left pilot, with the upper right pilot vented, the element of valve V3 will remain in the position shown regardless of the presence of the pilot signal at port 4. As already suggested, however, the presence of the pilot at port 4 sets the stage for a shifting of the element of V3 when the upper right left pilot is removed, as it is when the right chamber begins repressurizing, discussed below.

Each of pilots b, d and e are vented to atmosphere. Referring to Table I above, this corresponds to a left chamber drying, right chamber regenerating mode as illustrated in FIG. 1. Hence, the FIG. 3 controller in conjunction with a FIG. 1 dryer will always start in the beginning of the left chamber drying mode.

Considering further the application of the pressure pr to port 7 of valve V7, since TV2 and, consequently port 6 (and 4 also) of valve V7 are at ambient pressure, valve V7 will shift against spring 33 into its alternative position, not shown. It should be noted at this point that upon initial startup the left element of valve V8 blocks the application of any pressure at port 3 of valve V7, and consequently at port 5 of valve V5, until the pressure at the port 4 of valve V8 exceeds the minimum required to overcome spring 35, about 50 psi for the specific valve identified above. This assures that the timing volume TV1 will not undergo any pressurization through valves V7 and V6 prior to the actuation of valve V7, which terminates such pressurization by venting port 7 of valve V6 through port 1 of valve V7.

With valve V7 shifted into its alternative position, venting TV1 to atmosphere, TV2 will begin to pressurize through the variable orifice 26. This pressurization of TV2 will continue until the pressure at port 6 of valve V7 is sufficient to, with the assistance of the spring 33, shift valve V7 back into the position shown. It will be appreciated that the rate of pressurization of TV2 is a function of both the setting of the orifice 26 and the pressure pr. According to an aspect of the present invention, either or both of these two parameters may be varied to adjust the time period.

b. Left Chamber Drying, Right Chamber Repressurizing

The shifting of valve V7 back into the state illustrated in FIG. 3 triggers several other events which effect the termination of the right chamber regeneration phase and initiate the right chamber repressurization phase. One of the events is the application of the regulated pressure pr through valve V7 to port 7 of valve V6. Since TV1 and, consequently, port 6 (and port 4) of V6 are at ambient pressure at this point, the presence of the regulated pressure pr simultaneously shifts V6 and starts pressurizing the timing volume TV1 through the variable orifice 25. The shifting of valve V6 vents its port 8, which had theretofore been at the regulated pressure pr, to atmosphere. The venting of port 8 of valve V6 vents TV2 to atmosphere through internal check valve 39 and port 7 of valve V7 and ports 8 and 3 of valve V6.

The venting of port 8 of the valve V6 through its port 1 also causes the return of the element of V5 and the right element of V8 to their positions shown. The return of the element valve V5 applies the full line pressure p through its ports 3 and 2 to (i) output e and (ii) through ports 7 and 8, and 1 and 2, respectively, of valve V2, to both outputs a and d. Hence, as indicated in Table I, with outputs at c (continuing from the previous phase) and at a, d and e, the dryer is switched to its left chamber drying, right chamber repressurization mode. The return of the element of valve V8 to the position shown has the effect of venting the upper left internal pilot of V3 and the pilot at port 6 of V1. In the absence of any pressure at the pilot port 4 of valve V1, that valve holds its position. The presence of the pressure pr at the pilot port 4 of valve V3, as discussed above, however, shifts the element of that valve. With both ports 1 and 7 at vent, there is no immediate effect. It nevertheless sets the stage for the shift over from left chamber drying to right chamber drying at the next actuation of valve V8, discussed below.

This mode continues until the pressure in TV1 raises to the level at which its presence at port 6 (and port 4) of valve V6, with the assistance of the spring 32, causes the element of that valve to return to the state shown in FIG. 3. As noted above in connection with the filling of TV2, the time required to fill TV1 to the pressure required to shift the element of valve V6 may be controlled by adjusting either or both of the variable orifice 25 and the regulated pressure pr. It will be understood, of course, that adjustment of the regulated pressure pr will simultaneously affect the filling rates of both TV1 and TV2.

c. Right Chamber Drying, Left Chamber Regenerating

As a result of valve V6 returning to its initial position, regulated pressure pr is again applied to port 7 of valve V7, shifting the element of that valve to (i) initiate the filling of TV2 and (ii) vent TV1 to atmosphere through check valve 40 and port 7 of V6 and, in turn, through ports 8 and 1 of valve V7. Regulated pressure pr is also at port 4 of V5, shifting it against its spring 31, venting the repressurization valve pilot signal e through programming ports 30 and 29.

The regulated pressure pr is also applied to port 6 of valve V8, actuating it against its spring 35 and, consequently, passing through ports 1 and 2 of actuated valve V3 to actuate valve V1 through its pilot port 4. The shifting of V1, which has been unactuated throughout both phases of the left chamber drying portion of the cycle, effects a reversal of the logic to the inlet and exhaust valves which will prevail throughout both phases of the right chamber drying cycle. This logic reversal results from the appearance of the regulated pressure pr at port 2 rather than at port 8 of valve V1. As a consequence, the left element of valve V9 returns to its unactuated state, under the force of its spring 36, venting pilot line c. At the same time the right element of valve V9 is actuated against its spring 37, applying full line pressure at pilot line b.

The shifting of V1 also causes the shifting of valve V2 back into the position shown in FIG. 3 after having been in the actuated position throughout the left chamber drying phase. This results in the venting of pilot line a and the application of full line pressure at d. Hence, with line pressure at b and d but not at a, c or e, a right chamber drying with left chamber regenerating mode is established. See Table I.

It should also be noted that the shifting of V1 applies a regulated pressure pr signal at pilot port 6 of valve V3. This signal, however, has no effect in view of the opposing, superior pilot signal at the upper right pilot port of V3. This is the converse of the status of the pilot of valve 3 during the left chamber drying, right chamber regenerating phase described above. As was the case there, this status puts valve V3 in such a condition that it will actuate upon the next actuation of valve V8, which will vent port 1 of valve V3.

This mode will continue until the pressure in TV2 rises to a point sufficient to shift valve V7 back into the position shown in FIG. 3.

d. Right Chamber Drying, Left Chamber Repressurizing

The shifting of valve V7 back into its position in FIG. 3 triggers the same events as described under Left Chamber Drying, Right Chamber Repressurizing. The only difference between the outputs a-e at this mode as opposed to the former one are that the signals at b and c are reversed, with a signal at b instead of c. The signals are present at a, d and e in both cases. The end of this mode, marked by the shifting of valve V6 when timing volume TV1 rises to the appropriate pressure, marks the end of one complete cycle of both left and right chamber drying.

2. Switching Failure Alarm Circuit

Having explained the operation of the control system 20, the operation of an optional switching failure alarm circuit according to the invention and shown schematically at 100 in FIG. 5 will be described.

The alarm circuit 100 monitors whether, based upon the relative pressure levels in the beds LC and RC, a fundamental switching failure has occurred. From the explanation above, specifically the discussion of the NEMA cycles and the regenerating and repressurization times, throughout most of the cycle one bed is at line pressure processing inlet air, while the other one is at substantially ambient pressure being purged to regenerate it. Since this is the predominant condition, if the alarm circuit senses either bed to be at line pressure with the other at substantially ambient pressure, no signal will be given.

Another condition can also occur during normal operation, but only for a limited time. For a short period of time near the end of each drying cycle, typically within about 30 seconds, the off-stream bed is repressurized to substantially line pressure in preparation for its being switched on stream. Then, once the switchover occurs, the other bed which has just come off-stream will depressurize rapidly. In view of this characteristic of the operation, it is appropriate to consider there to have been a switching failure if both beds are at substantially line pressure for a time period longer than expected. The alarm circuit of the present invention provides a signal in such a case.

The other relative state of bed pressurization, i.e., both beds near ambient, should not occur during the regular cycling of the dryer, though it may be a transient condition upon start-up from ambient. Accordingly, the alarm circuit is designed to provide an alarm signal if it senses that both beds are at ambient for a longer period that can be expected upon normal start-up.

The four conditions and the alarm or no alarm indication are summarized in the following Table III, where the beds are identified as LC and RC, with an "X" opposite the bed indicating that the bed is at line pressure, and an "O" indicating that the bed is at ambient pressure, and an "S" indicating that signal will be given if the condition persists for longer than a predetermined time period.

|      | Condition |   |   |   |
|------|---|---|---|---|
|      | 1 | 2 | 3 | 4 |
| L.C. | X | O | X | O |
| R.C. | O | X | X | O |
| S    | O | O | X | X |

Figure 5:
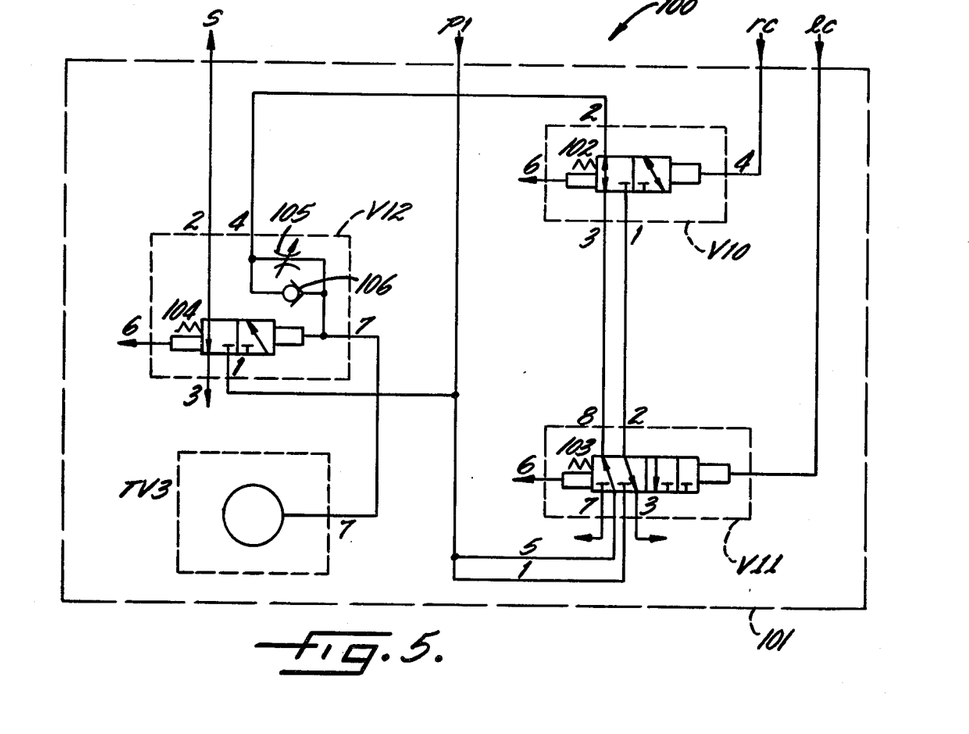
FIG. 5 is a schematic of an alarm circuit designed for use with the control system of FIG. 3.

Considering the schematic of the alarm circuit 100 in FIG. 5, in conjunction with the FIG. 1 (or FIG. 2) schematic depicting the alarm circuit in conjunction with a dryer 10 and a control system 20 according to the invention, the alarm circuit has three inputs to generate its single output—a pneumatic signal s suitable for actuating an alarm device AD. These inputs are a source of pressurized air p1 and pressure taps lc and rc from the beds LC and RC, respectively. While the pressurized air may be obtained from any convenient source, a convenient source is a tap from the regulated pressure line of the control system 20. Such a tap is illustrated in FIG. 3.

The alarm circuit 100 as shown in FIG. 5 includes three valves V10-V12 and a timing volume TV3 and interconnections therebetween. As with the control system 20, the valves for the alarm circuit 100 may be selected from the Clippard Minimatic ™ series and mounted to a manifold block 101. Specifically V10 may be a R-310 three-way valve; V11 may be a R-461 four-way six-ported valve; and V12 may be a R-333 three-way delay valve. The timing volume TV3, may be mounted directly to the manifold block or remote therefrom, depending on the size employed. A Clippard model number R-821 volume chamber mounted directly to the manifold block is depicted in FIG. 5.

Considering the operation of the alarm circuit, the inputs rc and lc are applied as pilots at ports 4 of valves V10 and V11, respectively. The other pilots at ports 6 of valves V10 and V11 are vented, such that a line pressure signal rc or lc at either of the respective valves will shift them to their alternate positions. With valve V12 in its condition shown, the alarm pilot signal s is at ambient. Inasmuch as the input p1 is directed, inter alia, to port 1 of valve V12, however, any actuation of the valve will provide an alarm signal. Port 6 of valve V12 is vented, such that actuation will occur only when the pressure in the timing volume TV3 is sufficiently high that its pressure, applied at port 7 of the valve, is sufficient to overcome the spring 104. This can happen only when sufficiently high pressure has been present at port 4 of valve V12 for a long enough period that air has been metered through the variable orifice 105 to raise the pressure in timing volume TV3 to a high enough pressure to overcome the spring 104. As with the filling of timing volumes TV1 and TV2 of the control system 20, the period to fill TV3 can be regulated by adjustment of either the pressure at port 4, the orifice 105, or both. As will be explained, any actuation of valve V12 can occur under two conditions—when both valves V10 and V11 have been actuated for the time required to pressurize TV3 sufficiently to actuate valve V12, or when both of those valves remain unactuated for that same time period.

With the pressure p1 applied to both port 1 and port 5 of valve V11, it is passed out either port 8 or port 2, depending on whether the valve element is unactuated, as shown, or actuated. So long as the element of valve V10 is in the opposite state of that of valve V11, it will block the pressure p1 from reaching port 4 of valve V12, venting that port and, through check valve 106, the timing volume TV3. It is contemplated that near the end of each repressurization period during the usual cycling of a dryer the pressure will be applied at port 4 of valve V12 for a short period of time insufficient to result in actuation of the valve prior to the timing volume TV3 being vented, allowing its pressure to fall back to ambient well in advance of the next repressurization period.

We claim as our invention:

1. A controller for an adsorbent fractionater having two adsorbent beds which are alternately switched between an on stream condition in which a bed is processing the product stream and an off stream condition in which a bed is first regenerated and then repressurized prior to being switched to the on stream condition, the alternate switching of the beds being effected by a flow valve system comprising inlet valves for selectively admitting gas to be processed into the adsorbent beds and exhaust valves for selectively releasing regeneration gas from the beds, the flow valves being controlled by pneumatic pilot signals, the controller comprising:

a source of pressurized gas;
first control valve means for selectively supplying pilot signals from the source to the inlet flow valves;
second control valve means for selectively supplying pilot signals from the source to the exhaust flow valves;
a pressure regulator for selectively reducing the pressure of the source gas to a lower, regulated pressure;
first and second pneumatic accumulators;
third control valve means to control the first and second control valve means to generate a schedule of pilot signals at the pressure of the gas source, the third control valve means comprising first and second variable orifices, the schedule of pneumatic pilot signals being based on the time intervals required to raise the pressures in the pneumatic accumulators from respective starting pressure levels to within respective predetermined pressure differentials relative to said regulated pressure, the time intervals being selectively variable through independent adjustment of the orifice sizes and the regulated pressure output of the pressure regulator, the pressure level of the pilot signals being unaffected by variations in the output of said pressure regulator.

2. The controller of claim 1 in combination with a pneumatically controlled switching failure alarm circuit, the alarm circuit comprising:

a second source of pressurized gas;
first and second pressure taps, one each from the two adsorbent beds;
a third pneumatic controller; and
fourth control valve means for generating a pneumatic alarm signal when both beds are either at substantially ambient pressure for longer than the time interval required to raise the pressure in the third pneumatic accumulator from a starting pressure level to an actuation pressure level or at substantially line pressure for longer than the time interval.

3. The controller of claim 2 wherein the second source of pressurized gas is tapped from the selectively regulatable output of the pressure regulator.

4. The controller of claim 1 wherein the dryer includes a repressurization valve controlled by a pneumatic pilot signal, the controller further comprising fifth control valve means which cooperate with the first and third control valve means to selectively supply a pilot signal from the source to a repressurization valve as well as the pilot signals to the exhaust flow valves.

5. The controller of claim 4 wherein the controller further comprises programming ports which may be interconnected in a first pattern to accommodate normally closed exhaust valves and in a second pattern to accommodate normally open exhaust valves.

6. The controller of claim 5 wherein the dryer includes a repressurization valve controlled by a pneumatic pilot signal, a change in the programming from the first pattern to the second pattern reversing the logic of the pneumatic control signal to the repressurization valve.

7. The controller of claim 1 wherein the control valve means are mounted to a manifold block having internal channels to interconnect the valves, the pneumatic accumulators being separately mounted with pneumatic lines connecting them to the manifold block.

8. The controller of claim 1 wherein the source of pressurized gas is tapped from the outlet of the fractionator and is substantially at the line pressure of the outlet.

* * * * *